No. 633,139. Patented Sept. 19, 1899.
T. A. KILLMAN & H. A. BRATTEN.
TYPE WRITING MACHINE.
(Application filed May 24, 1898.)

(No Model.) 6 Sheets—Sheet 1.

No. 633,139. Patented Sept. 19, 1899.
T. A. KILLMAN & H. A. BRATTEN.
TYPE WRITING MACHINE.
(Application filed May 24, 1898.)
(No Model.) 6 Sheets—Sheet 4.

UNITED STATES PATENT OFFICE.

THOMAS A. KILLMAN AND HERSCHEL A. BRATTEN, OF LIBERTY, TENNESSEE.

TYPE-WRITING MACHINE.

SPECIFICATION forming part of Letters Patent No. 633,139, dated September 19, 1899.

Application filed May 24, 1898. Serial No. 681,558. (No model.)

*To all whom it may concern:*

Be it known that we, THOMAS A. KILLMAN and HERSCHEL A. BRATTEN, citizens of the United States, residing at Liberty, in the county of De Kalb and State of Tennessee have invented a new and useful Type-Writing Machine, of which the following is a specification.

Our invention relates to type-writing machines, and has for its object to provide a simple, compact, and efficient construction and arrangement of parts whereby the manual shifting of the carriage at the end of each line, the independent manual operation of line-spacing mechanism, and the independent letter-spacing between words may be avoided, all of such adjustments being accomplished automatically, and, furthermore, to provide simple means for operating the printing devices and for adjustment to change the width of the space between lines.

Further objects and advantages of this invention will appear in the following description, and the novel features thereof will be particularly pointed out in the appended claims.

In the drawings,
Fig. 4 is a similar view showing the mechanism from the rear.

Similar numerals of reference indicate corresponding parts in all the figures of the drawings.

Figure 1:
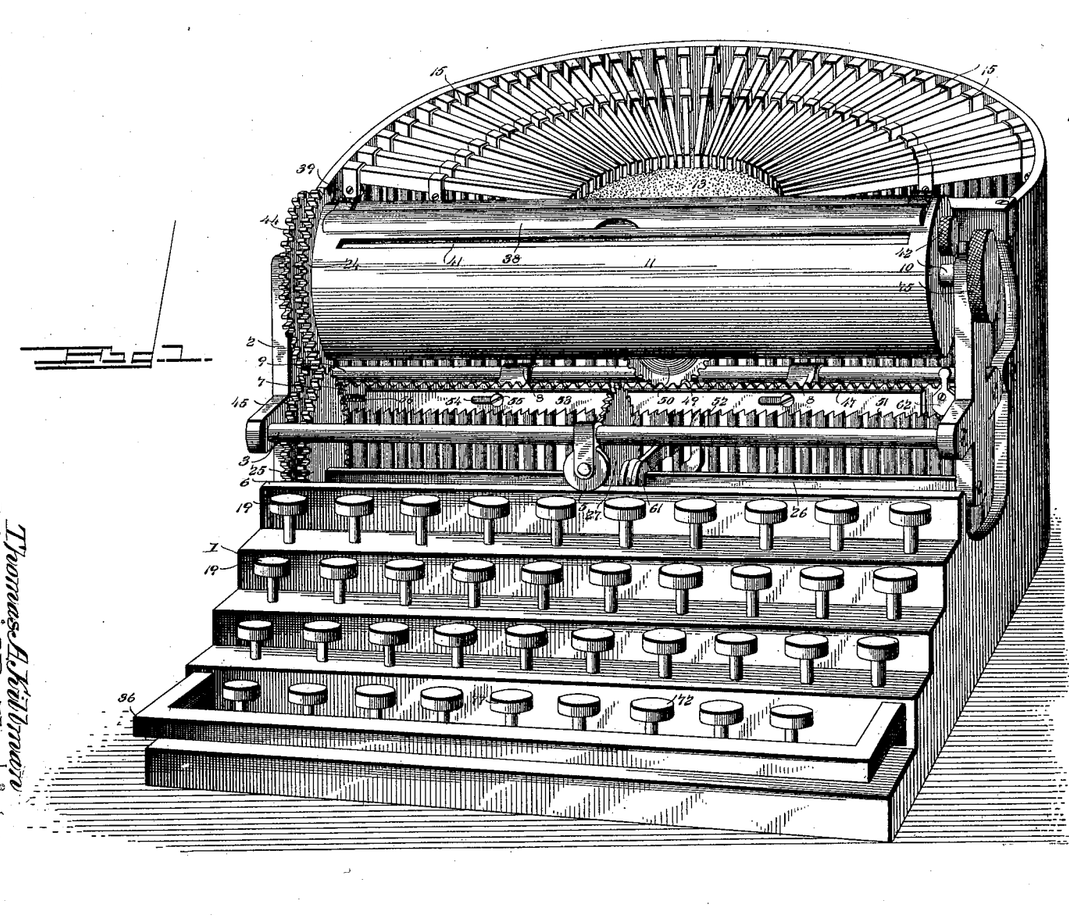
Figure 1 is a perspective view of a type-writing machine constructed in accordance with our invention.
Figure 2:
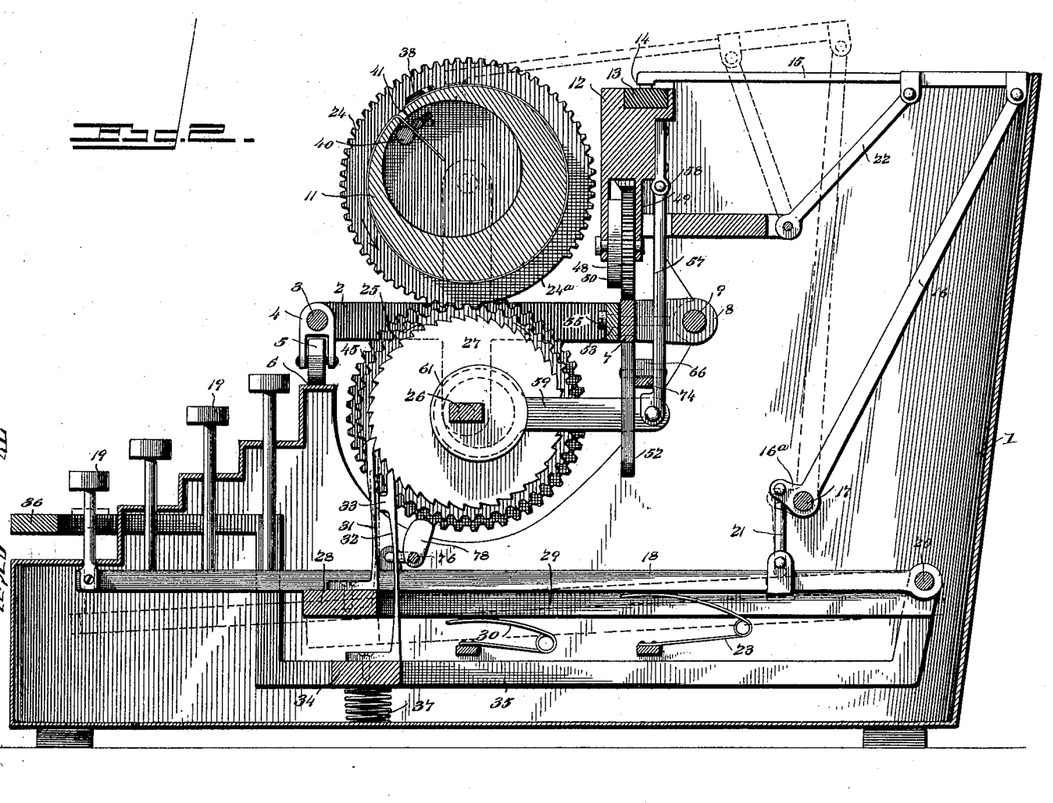
Fig. 2 is a longitudinal central section of the same.
Figure 3:
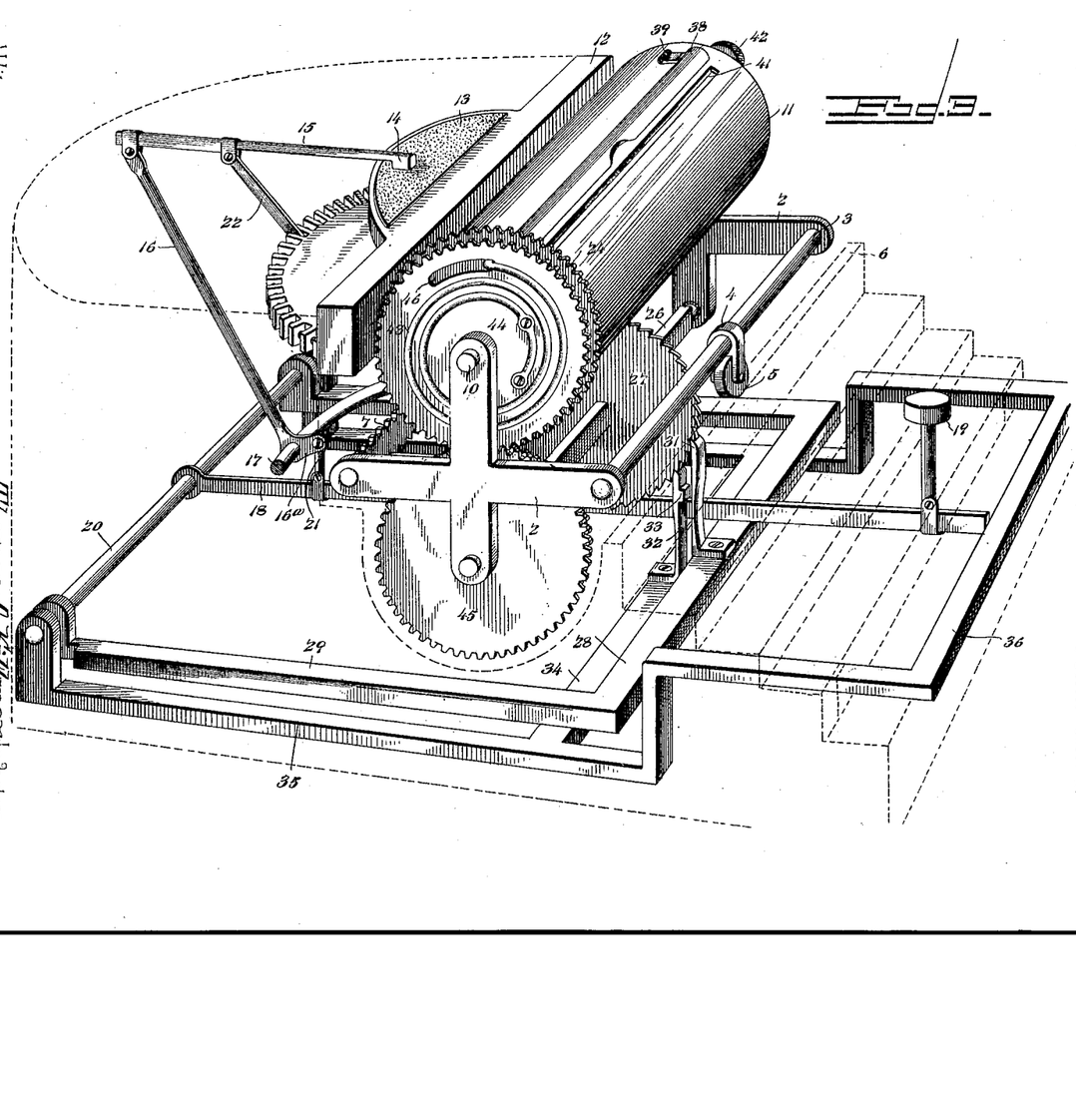
Fig. 3 is a perspective view of the operating mechanism with the casing omitted and indicated in dotted lines, only one of the printing-keys being illustrated.
Figure 4:
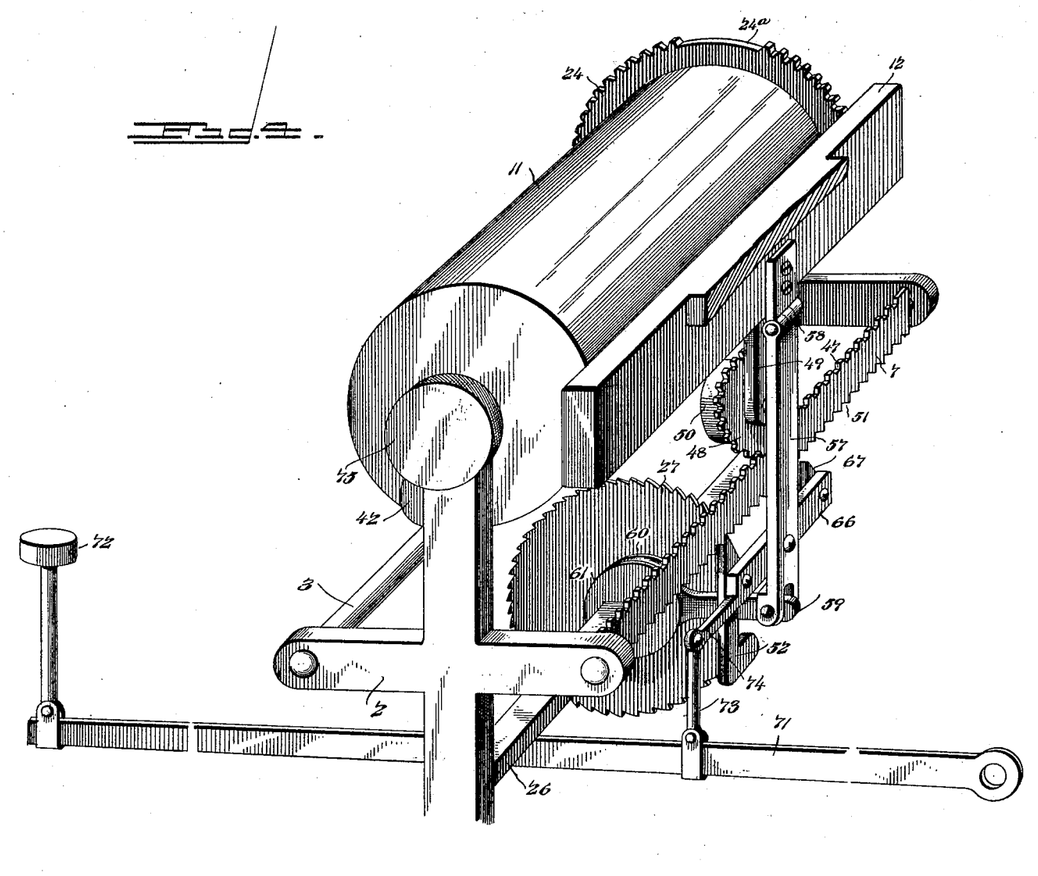
Figure 5:
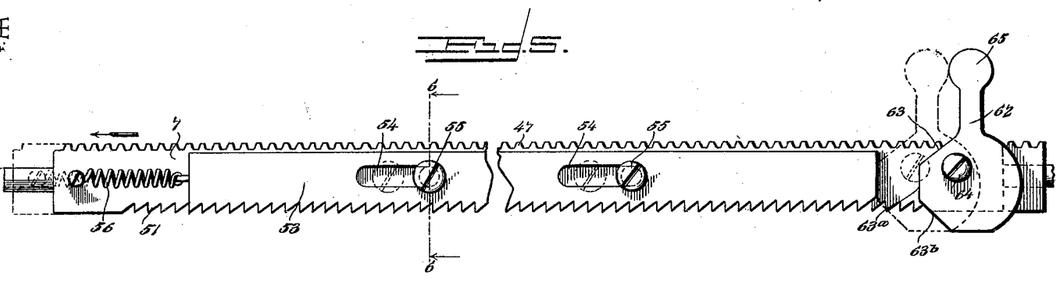
Fig. 5 is a detail front view of the ratchet members of the line-spacing mechanism, showing in full lines the normal position of the main ratchet and in dotted lines the adjusted or advanced position of the same prior to the movement of the auxiliary ratchet.
Figures 6, 7:
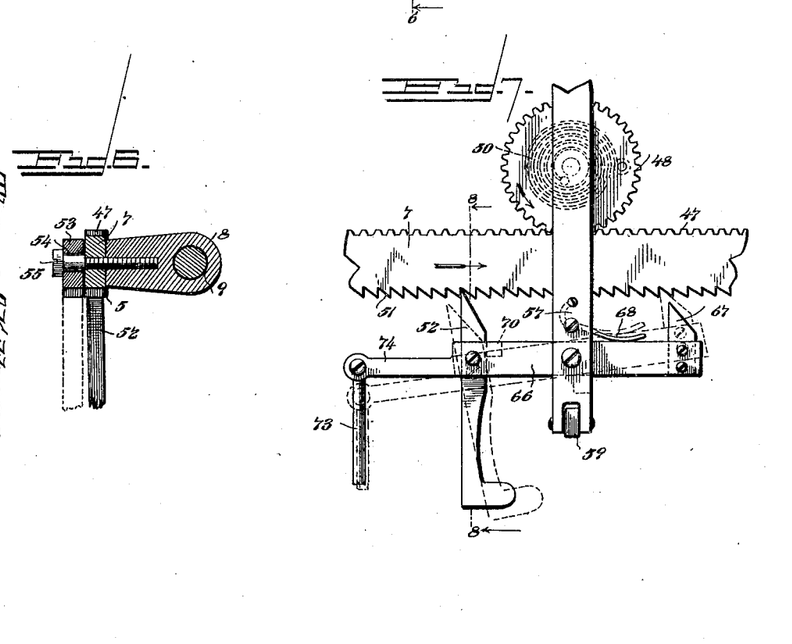
Fig. 6 is a detail sectional view of the line-spacing mechanism on the line 6 6 of Fig. 5.
Fig. 7 is a detail rear view of the line-spacing mechanism, inclusive of the ratchet and pawl members, a portion of the former being broken away, and indicating in full lines the normal and in dotted lines the adjusted position of the pawl-carrying rocking lever.
Figure 8:
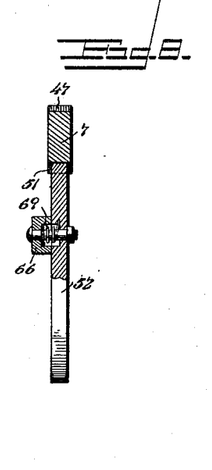
Fig. 8 is a detail sectional view of the operating or feed pawl on the plane indicated by the line 8 8 of Fig. 7.
Figure 9:
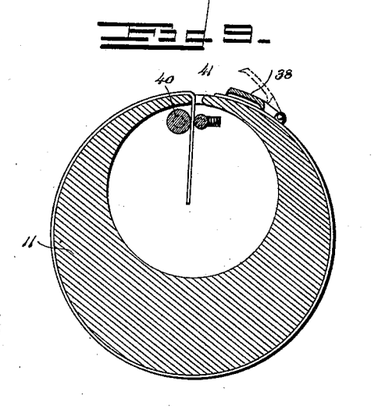
Fig. 9 is a detail transverse section of the platen to show the means for engaging opposite edges of the impression-sheet.
Figure 10:
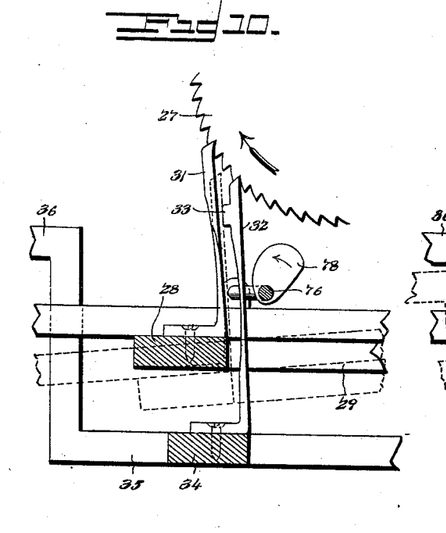
Fig. 10 is a detail side view of the letter-spacing mechanism, showing in full lines the normal and in dotted lines the adjusted or depressed position of the feed-pawl.
Figure 11:
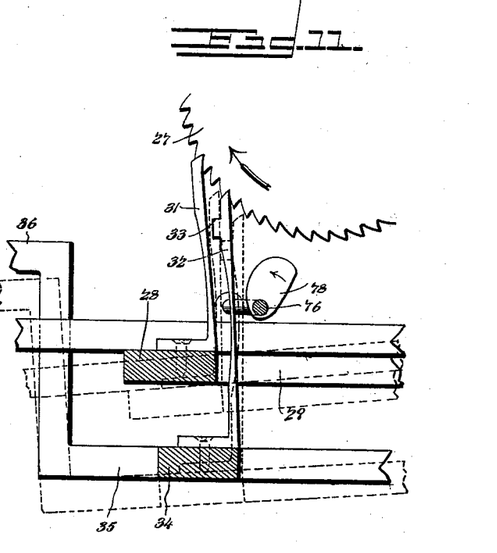
Fig. 11 is a similar view of the letter-spacing mechanism, showing in full lines the normal and in dotted lines the depressed or adjusted positions of the feed and stop pawls.

In a suitable stationary frame or casing 1, by which the operating parts of the mechanism are inclosed, is mounted a shifting frame or carriage 2, including terminal spiders arranged in planes parallel with the lines of writing and connected by suitable longitudinal members, hereinafter fully described, which extend in directions transverse to the lines of writing. The forward arms of the terminal spiders are connected by a frame-bar 3, upon which, at an intermediate point, is fitted a sleeve 4, carrying a supporting-roll 5, which traverses a carriage guide or track 6, which is parallel with the direction of movement of the carriage, but is transverse to the lines of writing, as will hereinafter appear. The rear arms of said spiders are connected by a bar 7, to which are attached guide-sleeves 8, mounted upon a second stationary guide 9, which connects opposite sides of and is secured terminally to the frame 1. Also, mounted in suitable bearings in the upper vertical arms of the spiders is the spindle 10 of a roller-platen 11, which constitutes a revoluble printing-surface adapted to carry the sheet or other medium which is to receive the impression of the printing characters.

Upon a fixed portion of the frame 1, of which a stationary bar 12 arranged parallel with the axis of and in rear of the platen is a part, is an inking-pad 13, constituting the normal rest for the type-heads 14, carried by the type-arms 15, and these type-arms are connected at their rear ends with the upper long arms 16 of bell-crank levers fulcrumed upon a bearing-rod 17, terminally secured to the stationary frame. Key-levers 18, carrying keys 19, are fulcrumed at their rear ends upon a bearing-rod 20, also supported by the main frame, and at intermediate points said key-levers are connected by links 21 with the short forwardly-extending arms 16ª of said bell-crank levers. Also connected with the type-arms at intermediate points are controlling-links 22, which are mounted at their lower ends upon the frame 1, whereby as the long arms of the bell-crank levers are swung forwardly by the depression of the front ends of said levers the controlling-links 22 cause the type-heads 14 to describe segmental paths rising from the pad 13, passing forwardly, and descending upon the surface of a sheet arranged upon the platen 11. The key-levers should be provided with return-springs 23 to return them after depression to their normal positions, thereby carrying the connecting-levers 16 16ª to their normal positions and causing the type-heads to retraverse a segmental path to their positions in contact with the inking-pad.

Secured to the platen at one end is a gear 24, adapted for forward rotary movement in the direction indicated by the arrows in the drawings to communicate motion in the same direction to the platen, and meshing with this platen-gear is a driving-gear 25, which is fixed to a rotary shaft 26, mounted in suitable bearings in the lower arms of the terminal spiders of the carriage, said shaft 26 being of cross-sectionally angular construction, whereby an axially-stationary letter-spacing ratchet 27, through which said shaft extends, may impart rotary motion to the shaft without interfering with the independent axial movement of said parts. It will be understood that an equivalent of the angular construction of shaft would consist of any such feathered connection between the shaft and the letter-spacing ratchet as would provide for the independent axial movements of said members while preventing independent movement thereof.

A universal lever, consisting of a universal bar 28, extending under and in the paths of the several key-levers, and an arm 29, extending rearwardly from the extremities of the universal bar, is mounted upon the main frame and may be fulcrumed, as shown, upon the bearing-rod 20 of the key-levers, said universal lever being provided with one or more return-springs 30, by which it is yieldingly held in its elevated or normal position and is returned to such position after the depression of the universal bar by the operation of a key-lever. The universal bar carries a letter-spacing feed-pawl 31, of which the free end is arranged in operative relation with the letter-spacing ratchet-wheel 27, and as the universal bar is depressed by the operation of a key-lever said pawl passes from one tooth of the ratchet-wheel to the next, whereupon the release of the key-lever and the return of the universal bar to its normal position advance the ratchet-wheel a distance equal to the interval between two contiguous peripheral teeth thereof. This advance rotary movement of the ratchet-wheel, obviously, is communicated through the shaft 26 to the driving-gear 25, and hence to the platen or driven gear 24, to turn the platen through a distance equal to the interval between two printing characters.

The depression of the universal bar at each operation of a key-lever is sufficient to carry the letter-spacing pawl 31 downwardly through a distance equal to two tooth-spaces of the letter-spacing ratchet 27; but the engagement of said pawl with the second ratchet-tooth is prevented by a movable stop 32, arranged in the path of the pawl 31, whereby when a key-lever is depressed to disengage the extremity of the pawl 31 from one tooth said free end swings backward into contact with said stop 32 and is thereby held in position to engage the next ratchet-tooth until the key-lever is released. This movable stop 32 is carried by a word-spacing pawl 33, also arranged in operative engagement with the ratchet-wheel 27 and normally serving as a stop-pawl to prevent backward movement of the ratchet during the movement of the letter-spacing pawl 31 from its position in engagement with one tooth to its new position in engagement with the fixed tooth. This word-spacing pawl, however, is carried by a cross-bar 34 of the word-spacing lever 35, of which the arms are arranged under the arms 29 of the universal lever and are extended forwardly in advance of the universal bar to carry the space-bar 36, disposed in front of the keyboard and within reach of the thumbs of the operator's hands. When it is desired to make a double space between words, the space-bar 36 is depressed simultaneously with the key representing the last character of a word or the character following which such double space is to be formed, thereby disengaging the word-spacing pawl 33 from the tooth of the ratchet, with which it has been engaged, and allowing it to spring backward into position for engagement with the next tooth of the ratchet, thus removing the stop 32 from the path of the letter-spacing pawl 31. Hence when the space-bar is depressed simultaneously with a key-lever the pawl 31, instead of being checked in its rearward movement by the stop 32, is allowed to assume a position to engage the second tooth of the ratchet from that with which it has been engaged, and, therefore, upon the release of the key-lever and the return of the universal bar to its normal position the ratchet 27 is advanced through an interval equal to two tooth-spaces. Obviously the space-bar (which should be yieldingly held in its elevated or normal position by a suitable return-spring 37) may be depressed successively and independently of a key-lever in order to increase the interval between words or between sentences.

The means which we have illustrated in the drawings for holding a letter or other impression sheet upon the platen include a spring-actuated clamp-bar 38, having arms 39 by which attachment to the platen is accomplished, and a tension-roll 40, mounted in a longitudinal cavity in the platen, said cavity being in communication with a longitudinal slot 41, through which one edge of a letter-sheet may be extended. The spindle of the tension-roll is provided at one end of the platen with a thumb-wheel 42, and in applying a sheet to the platen one edge thereof being introduced through the slot 41 is caught by the tension-roll and the other edge of the sheet is engaged by the clamp-bar 38. By turning the tension-roll the sheet may be drawn tightly around the platen to remove all looseness and insure a firm bearing and backing of the sheet by the platen.

The space occupied by the slot 41 and clamp-bar 38 constitutes an inoperative portion of the surface of the platen, and hence during the operation of the machine the lines of writing, which extend circumferentially around the platen, must begin at one side of this inoperative space and terminate at the opposite side thereof, and means must be provided whereby when the platen has made one complete revolution, less the width of said inoperative space, it must turn sufficiently to cause the inoperative space to pass the printing-point between two successive operations of a key lever or levers. In order to accomplish this spacing movement of the platen to complete the revolution thereof and arrange the platen in position to begin a line of writing, we employ an automatic-spacing mechanism, including a spiral spacing-spring 43, secured at one end to a tension-gear 44, loosely mounted upon the spindle of the platen and meshing with a gear 45, which is fixed to the shaft 26 coaxially with the gear 25. The other end of the spacing-spring 43 extends through a segmental slot 46 in the gear 44 and is attached to the platen-gear 24. The intermeshing gears 44 45 and 24 25, which are thus arranged in pairs, the gear 44 being loose, are so proportioned as to the number of teeth that during the advance movement of the platen through one complete revolution, less the inoperative space above described, the gear 44 gains in angular movement over the gear 24 a distance equal to the width of said inoperative space, thereby gradually coiling the spacing-spring 43 as the platen advances from its position at the beginning of a line to its position at the end of said line. When the platen reaches its terminal rotary position at the end of a line of writing, the platen-gear 24 is released for actuation by the spacing-spring 43 through an interval equal to the width of said inoperative space, and this release is accomplished by mutilating the gear 24 or by omitting a series of teeth to form a smooth-surfaced or cut-away portion 24ª equal in extent to the width of the inoperative space.

In order to accomplish the tightening of the spacing-spring 43 so as to cause the "jumping" or abrupt advance movement of the platen at the proper point to change the platen from its position at the end of a line to that which it must occupy at the beginning of the next line, we may construct the gears 44 and 45 with an equal number of teeth, as eighty, and construct the gears 24 and 25 of different circumferential measurements, whereby the toothed portion of the mutilated gear 24 has a number of teeth equal to that of the gear 25. Then as the letter and word-spacing operations proceed and advance the platen from its initial to its terminal rotary position or from its position at the beginning of a line of writing to its position at the end of such line the gear 44 will gradually gain in angular position upon the gear 24 and will wind the spacing-spring 43. When the terminal point of the operative surface of the platen comes into the printing plane, the cut-away or non-toothed portion of the mutilated gear 24 will register with the gear 25 and the spacing-spring 43 will quickly advance the platen to its initial position, ready for the next line of writing, and the teeth of the gear 24 will be reëngaged with those of the gear 25.

The line-spacing mechanism of the type-writing machine embodying our invention includes a rack consisting of teeth 47 on the bar 7, which connects the terminal spiders of the carriage, and to which the guide-sleeves 8 are attached, and a spur feed-gear 48, mounted in a depending bracket 49 of the transverse bar 12, said feed-gear being provided with a carriage-actuating spring 50, which forms the power by which line-spacing movement is imparted to the carriage. One end of this spring 50 is attached to the gear 48 and the other end to the bracket, whereby the tension of the spring turns the gear 48 to advance the carriage when the latter is released by the controlling mechanism provided for that purpose and hereinafter described, and whereby the spring is tightened to produce the desired tension by the return movement of the carriage, which is accomplished manually. The bar 7 also preferably carries ratchet-teeth 51, forming a feed-ratchet for engagement by a line-spacing feed-pawl 52, which is mounted for reciprocatory movement parallel with the lines of writing or transversely to the said feed-ratchet for engagement with a holding-ratchet 53, mounted upon the feed-ratchet for limited movement transversely to the lines of writing and independently of said feed-ratchet, and hence independently of the carriage, of which the feed-ratchet forms a fixed part. This holding-ratchet bar 53 is guided by means of slots 54, engaged by guide-pins or screws 55, and a return-spring 56 is employed in connection with the holding-ratchet to advance the same in the direction of movement of the carriage after each engagement thereof by the feed-pawl 52. Thus with the feed-pawl in normal engagement with the feed-ratchet the forward movement thereof to cause engagement with the holding-ratchet will release the carriage and allow the advance of the latter, actuated by the spring 50, through a distance equal to the possible independent movement of the holding-ratchet with relation to the feed-ratchet. For instance, if the holding-ratchet has an extent of movement equal to a single-line space, the disengagement of the feed-pawl from the teeth of the feed-ratchet and simultaneous engagement thereof with a tooth of the holding-ratchet will allow the advance of the carriage through a distance equal to a single-line space, whereupon the return of the feed-pawl into engagement with the registering teeth of the feed-ratchet will release the holding-ratchet and permit it to return under the influence of its spring 56 to its normal position.

In the construction illustrated the feed-pawl 52 is carried by an oscillatory arm or hanger 57, hinged or otherwise mounted, as at 58, upon the main frame and preferably upon the bar 12 thereof, and this oscillatory arm is connected by a rod 59 with an eccentric-strap 60, mounted upon an eccentric 61, which is carried by the hub of the ratchet-wheel 27, said ratchet-wheel being held from axial movement in a direction parallel with the shaft 26 by the rod 59, while allowing the independent movement of the shaft 26, as will be understood from the foregoing description. Hence for each complete revolution of the ratchet-wheel 27 the feed-pawl 52 will be advanced from its position in engagement with the feed-ratchet 47 to a position in engagement with the holding-ratchet 53, thereby allowing the advance of the carriage (at the moment that the platen spaces forward to avoid the inoperative portion of the surface thereof) to form a space between lines.

As above indicated, the interval through which the carriage will advance during each disengagement of the feed-pawl from the feed-ratchet will depend upon the extent of possible movement of the holding-ratchet independently of the feed-ratchet, and in order that the length of space between lines may be varied we provide an adjustable cam-stop 62, mounted upon the feed-ratchet or other fixed portion of the carriage in the path of the movement of the holding-ratchet in opposition to its return-spring 56 and provide said stop with a plurality of stop-faces 63 63ª 63ᵇ, arranged at different distances from the center or axis 64 of the cam. Either of said stop-faces may be arranged in the path of the holding-ratchet to limit the independent movement of the latter by manual pressure applied to a handle 65 of the stop.

It is also necessary in a machine of the class to which our invention belongs to provide means whereby line-spacing of the carriage may be accomplished manually or independently of the automatic devices above described, and hence instead of mounting the feed-pawl 52 directly upon the hanger 57 we mount it upon a rocking lever 66, which is fulcrumed upon said hanger at an intermediate point and which in addition to the feed-pawl 52 carries a stop-pawl 67, also adapted to engage the teeth of the feed-ratchet when the lever, which is yieldingly held to maintain the feed-pawl in engagement with said ratchet, is tilted or is moved in opposition to its actuating-spring 68. The feed-pawl 52 is mounted for swinging movement upon the rocking lever 66 and is actuated by a spring 69, whereby when said lever is actuated to withdraw the feed-pawl from engagement with the feed-ratchet said pawl is advanced by its actuating-spring to a position in alinement with the next tooth of the feed-ratchet, the engagement of the stop-pawl 67 with said feed-ratchet meanwhile holding the carriage from advance movement. When the rocking lever is released to cause the reëngagement of the feed-pawl with the feed-ratchet, the carriage-actuating spring advances the latter, and with it the feed-pawl, through an interval equal to one tooth-space of the feed-ratchet. Obviously a fixed stop 70 must be arranged in the path of the feed-pawl. The means illustrated in the drawings for accomplishing this independent spacing of the carriage by the actuation of the rocking lever 66 includes a line-spacing lever 71, carrying a line-spacing key 72 and connected by a link 73 with an extension 74 of said rocking lever. Obviously this spacing-lever may be operated as frequently as desired to cause the advance of the carriage by steps when larger spaces than those formed automatically are desired between the lines of writing.

In the construction illustrated the spindle of the platen is provided with a handhold or wheel 75 to facilitate the operation of the platen in applying and removing a sheet, and in order to release the gears and other connections to allow free rotary movement of the platen we employ trip mechanism, which may be of any suitable construction, but which in the drawings is shown as a rock-shaft 76, having a trip-key lever 77, exposed for manual depression, and trip arms or cams 78 for engagement with the letter and word spacing pawls 31 and 33, to disengage said pawls simultaneously from the ratchet 27.

From the foregoing description it will be seen that during the operation of the key-levers the platen receives a step-by-step advance rotary movement, due to the operation of the letter-spacing mechanism, and whenever a word-space is required or a double letter-space between words or characters in the line the space-bar is depressed simultaneously with the key-lever, which is actuated just prior to said required space. This depression of the space-bar may be accomplished by the thumb of the hand by which the key-levers are actuated. Thus there is no loss of time due to spacing between words or characters in the line. When the end of the line is reached, the platen is automatically advanced by the shifting mechanism, including the gears 24 and 25, 44 and 45, and the coöp- erating parts to adjust the platen to its initial position, this also being accomplished without loss of time and without interrupting the successive operation of the key-levers. Simultaneously with the shifting of the platen to arrange it in its initial position the carriage is advanced through a line-space of which the extent is regulated by the adjustment of the stop 62. Hence in writing a continuous article the operation of the key-levers may be continuous, the platen being adjusted at the proper time to produce letter, word, and line spaces, as required.

The extent to which the edge of the impression-sheet is introduced into the slot of the platen regulates the width of the margin, and hence for convenience it may be stated that the interval through which the platen is advanced to carry the inoperative portion of its surface beyond the printing plane constitutes a margin-space and that the combination of devices by which this extended forward movement of the platen is accomplished constitutes a margin-spacing mechanism, the parts being so disposed that the letter-spacing and margin-spacing of the platen are accomplished successively to allow the continuous operation of the printing mechanism, as above described. Furthermore, it will be understood that the letter and line spacing mechanisms forming parts of our invention are not necessarily used in connection with the type-arm construction of printing mechanism set forth herein, as they may be employed with advantage in connection with other types of machines wherein printing mechanisms of different kinds well-known in the art are used.

The term "axially-stationary" ratchet-wheel, as applied to the ratchet-wheel 27, is intended to indicate that this ratchet-wheel, while adapted to turn to communicate rotary motion to its shaft or spindle 26, is held from movement in a direction parallel with said shaft or spindle or, in other words, is held from axial movement while longitudinal movement of the shaft or spindle 26 through said said ratchet-wheel and with the carriage is permitted.

Various changes in the form, proportion, and the minor details of construction may be resorted to without departing from the spirit or sacrificing any of the advantages of this invention.

Having described our invention, what we claim is—

1. In a type-writing machine, the combination with a supporting-frame, of a platen-supporting carriage mounted for movement parallel with the axis of the platen, printing mechanism, an axially-stationary ratchet-wheel having its shaft mounted upon the carriage and capable of axial movement therewith independently of the ratchet-wheel, connections between the ratchet-wheel shaft and the platen and mounted upon the carriage for communicating rotary motion to the platen, means actuated by the printing mechanism for imparting a step-by-step rotary movement to the ratchet-wheel, and carriage-feeding mechanism operatively connected with the ratchet-wheel, substantially as specified.

2. In a type-writing machine, the combination with a supporting-frame, of a platen-supporting carriage mounted for movement parallel with the axis of the platen, printing mechanism, an axially-stationary ratchet-wheel having its shaft mounted upon the carriage and capable of axial movement therewith independently of the ratchet-wheel, letter and margin spacing mechanism having coöperating spring-connected rotary members, respectively connected with and independent of the platen, gears carried by said ratchet-wheel shaft for differentially advancing said members, means actuated by the printing mechanism for imparting a step-by-step rotary movement to the ratchet-wheel, and carriage-feeding mechanism operatively connected with the ratchet-wheel, substantially as specified.

3. In a type-writing machine, the combination with a supporting-frame, of a platen-supporting carriage mounted for movement parallel with the axis of the platen, printing mechanism, an axially-stationary ratchet-wheel having its shaft mounted upon the carriage and capable of axial movement therewith independently of the ratchet-wheel, letter and margin spacing mechanism comprising spring-connected gears arranged coaxially with, and respectively attached to and independent of the platen, the attached gear being mutilated and of larger diameter than the loose gear, and coöperating gears fixed to the ratchet-wheel shaft and respectively meshing with said spring-connected gears, for differentially advancing the same, means actuated by the printing mechanism for imparting a step-by-step rotary movement to the ratchet-wheel, and carriage-feeding mechanism operatively connected with the ratchet-wheel, substantially as specified.

4. In a type-writing machine, the combination with a supporting-frame having carriage-guides, of a carriage having terminal armed spiders, of which the forward and rearward extending arms are connected by longitudinal bars, an axially-fixed rotary ratchet-wheel having an axially-movable shaft mounted in bearings in the downward-extending arms of said spiders, a platen having its trunnions mounted in bearings in the upward-extending arms of the spiders, connections between the ratchet-shaft and said platen for communicating letter and marginal spacing motion thereto, printing mechanism, means actuated by the printing mechanism for imparting a step-by-step rotary movement to the ratchet-wheel, and carriage-feeding mechanism operatively connected with the ratchet-wheel, substantially as specified.

5. In a type-writing machine, the combination with a supporting-frame having carriage-guides, of a carriage having terminal armed spiders, of which the forward and rearward extending arms are connected by longitudinal bars, the rear longitudinal bar having a toothed rack, a spring-actuated carriage-advancing pinion meshing with said rack, an axially-fixed rotary ratchet-wheel having an axially-movable shaft mounted in bearings in the downward-extending arms of said spiders, a platen having its trunnions mounted in bearings in the upward-extending arms of the spiders, connections between the ratchet-shaft and said platen for communicating letter and marginal spacing motion thereto, printing mechanism, means actuated by the printing mechanism for imparting a step-by-step rotary movement to the ratchet-wheel, and carriage-feeding mechanism operatively connected with the ratchet-wheel, substantially as specified.

6. In a type-writing machine, the combination with printing mechanism, of a revoluble platen and means for imparting motion thereto, said platen being provided with a surface holding-clamp and an interior roller for engaging one edge of an impression-sheet, said roller being accessible through a slot in the surface of the platen, substantially as specified.

7. In a type-writing machine, the combination with printing mechanism, of a revoluble platen and means for imparting motion thereto, said platen being provided with a holding-clamp and a longitudinal slot communicating with a cavity, and a roller mounted in the cavity for engagement with one edge of an impression-sheet and provided with exteriorly-accessible means whereby rotary motion may be communicated to the roller, substantially as specified.

8. In a type-writing machine, the combination with a movable platen and printing mechanism for coöperation therewith, of a ratchet mounted for step-by-step movement and operatively connected with the platen, a letter-spacing pawl mounted for reciprocatory movement in a path diverging from the path of the ratchet-teeth, for imparting movement to the ratchet, and also capable of transverse vibration to cause terminal engagement thereof with the ratchet-teeth, and a movable stop arranged in the path of transverse movement of said pawl, substantially as specified.

9. In a type-writing machine, the combination with a movable platen and printing mechanism for coöperation therewith, of a ratchet mounted for step-by-step rotary movement and operatively connected with the platen, a universal bar arranged in operative relation with movable elements of the printing mechanism, a reciprocatory letter-spacing pawl carried by the universal bar for movement in a path tangential to the ratchet, and adapted for transverse vibration to engage the teeth of the ratchet, a movable stop arranged in the path of transverse movement of said pawl, and means for temporarily withdrawing said stop from the path of the pawl, substantially as specified.

10. In a type-writing machine, the combination with printing mechanism, and a coöperating movable platen, of platen-feeding mechanism including a ratchet operatively connected with the platen, a pawl engaging said ratchet and actuated by the printing mechanism, said pawl being capable of longitudinal reciprocatory movements of uniform amplitude, in a path tangential to the ratchet, and also being capable of transverse vibration toward and from the periphery of the ratchet, and means for controlling the transverse vibration of the pawl to cause engagement thereof with successive or alternate teeth of the ratchet, substantially as specified.

11. In a type-writing machine, the combination with printing mechanism, and a coöperating movable platen, of platen-feeding mechanism including a ratchet operatively connected with the platen, a pawl engaging said ratchet and actuated by the printing mechanism, said pawl being capable of longitudinal reciprocatory movements of uniform amplitude, in a path tangential to the ratchet, and also being capable of transverse vibration toward and from the periphery of the ratchet, and manually-controlled means for limiting the transverse vibration of the pawl to cause the engagement thereof with successive or alternate teeth of the ratchet, substantially as specified.

12. In a type-writing machine, the combination with printing mechanism, and a coöperating movable platen, of platen-feeding mechanism including a ratchet operatively connected with the platen, a tangentially-reciprocatory pawl actuated by the printing mechanism and adapted for terminal vibratory movement toward and from the path of movement of the ratchet-teeth, a movable stop normally arranged in the path of vibratory movement of said pawl toward the ratchet-teeth, to limit said movement and cause the engagement of the pawl with successive teeth, and means for withdrawing the stop from the path of the pawl to allow the latter to engage alternate teeth, substantially as specified.

13. In a type-writing machine, the combination with printing mechanism, and a coöperating movable platen, of platen-feeding mechanism including a ratchet-wheel operatively connected with the platen, a pawl operatively connected with the printing mechanism and arranged in operative relation with the ratchet for tangential reciprocation and terminal vibration, a movable stop normally arranged in the path of vibratory movement of the pawl to limit the same to engage successive teeth of the ratchet, and means, operable with an element of the printing mechanism, for withdrawing the stop from the path of said pawl, substantially as specified.

14. In a type-writing machine, the combination with printing mechanism, and a coöperating movable platen, of platen - feeding mechanism including a peripherally-toothed ratchet operatively connected with the platen, a laterally-yielding letter-spacing pawl mounted for reciprocatory movement to impart step-by-step motion to said ratchet, and adapted to vibrate at its extremity toward and from the periphery of the ratchet, means actuated by the printing mechanism for imparting a reciprocatory movement through a uniform distance to said pawl, in a path tangential to the ratchet, a movable stop normally arranged in the path of the vibratory movement of the pawl to limit the terminal movement of the latter to engagement with successive teeth of the ratchet, and means, including a depressible element, located contiguous to the keyboard, for withdrawing said stop from the path of the pawl, substantially as specified.

15. In a type-writing machine, the combination with printing mechanism, and a coöperating movable platen, of platen-feeding mechanism including a rotary ratchet operatively connected with the platen, a letter-spacing pawl normally in engagement with the teeth of the ratchet, means actuated by the printing mechanism for imparting a reciprocatory movement to said pawl in a path tangential to the ratchet, a stop-pawl also normally in engagement with the ratchet, said pawls being spring-actuated for transverse terminal vibration, a stop carried by the stop-pawl and normally arranged in the path of the letter-spacing pawl to limit the terminal vibratory movement of the latter to engagement with successive teeth of the ratchet, and means for simultaneously disengaging said letter-spacing and stop pawls from the teeth of the ratchet, to remove said stop from the path of the letter-spacing pawl, substantially as specified.

16. In a type-writing machine, the combination with a movable platen, and printing mechanism including key-levers, of platen-feeding mechanism including a ratchet operatively connected with the platen, a spring letter-spacing pawl for engagement with the ratchet, a universal bar actuated by the key-levers and operatively connected with the letter-spacing pawl for imparting reciprocatory movement thereto, a spring stop-pawl also normally in engagement with the ratchet and carrying a stop which is normally disposed in the path of said letter-spacing pawl to limit the terminal movement of the latter to engagement with successive teeth of the ratchet, and a spacing-lever carrying said stop-pawl and having a space-bar arranged in the keyboard, for depression simultaneously with a key-lever to withdraw the stop-pawl from engagement with the ratchet and the stop from the path of the letter-spacing pawl, substantially as specified.

17. In a type-writing machine, the combination with a supporting-frame, a platen-supporting carriage mounted thereon, and printing mechanism, of a peripherally-toothed axially-fixed ratchet-wheel, operating connections between the ratchet-wheel and the platen, and carriage-feeding mechanism operatively connected with the ratchet-wheel, a universal bar adapted for actuation by members of the printing mechanism, a feed-pawl carried by the universal bar for engagement with the teeth of the ratchet-wheel and having a spring tendency toward said teeth, a depressible space-bar, and a stop-pawl carried by the space-bar in the path of the feed-pawl in its movement toward the ratchet-wheel and having a spring tendency toward the teeth of the ratchet-wheel, said stop-pawl being adapted to limit the movement of the feed-pawl to engage successive teeth of the ratchet-wheel, and also being adapted for disengagement from the ratchet-wheel to allow a movement of the feed-pawl greater than that which is necessary to engage successive teeth of the ratchet-wheel, substantially as specified.

18. In a type-witing machine, the combination with a supporting-frame, a platen-supporting carriage mounted thereon, and printing mechanism, of a peripherally-toothed axially-fixed ratchet-wheel, operating connections between the ratchet-wheel and the platen, and carriage-feeding mechanism operatively connected with the ratchet-wheel, a universal bar adapted for actuation by members of the printing mechanism, a feed-pawl carried by the universal bar for engagement with the teeth of the ratchet-wheel and having a spring tendency toward said teeth, a depressible space-bar, and a stop-pawl carried by the space-bar and having a spring tendency toward the teeth of the ratchet-wheel, and a stop carried by said stop-pawl and arranged in the path of the feed-pawl to limit the forward movement of the latter when disengaged from the ratchet-wheel, said stop-pawl being depressible by means of the space-bar to disengage it from the ratchet-wheel and withdraw the stop from the path of the feed-pawl, substantially as specified.

19. In a type-writing machine, the combination with a supporting-frame, a platen-supporting carriage mounted upon the frame, and printing mechanism, of an axially-fixed ratchet-wheel, a universal bar arranged in the path of movable elements of the printing mechanism, a spring feed-pawl carried by the universal bar for engagement with the teeth of the ratchet-wheel, and adapted when released therefrom to spring forward into engagement with a successive tooth, a stop-pawl also in terminal engagement with the teeth of the ratchet-wheel and carrying a stop arranged in the path of the feed-pawl for limiting the advance movement thereof, and a trip-cam arranged in operative relation with the stop-pawl, and adapted, by transverse displacement thereof, to simultaneously disengage the stop and feed pawls from the ratchet-wheel, substantially as specified.

20. In a type-writing machine, a carriage-feeding mechanism comprising feeding and holding ratchets, of which the latter is capable of movement independent of the former through a distance equal to the combined widths of a plurality of ratchet-teeth, a transversely-reciprocatory element for alternate engagement with the teeth of said ratchets, and an adjustable stop for limiting the independent movement of said holding-ratchet to a throw equal to the width of one or more ratchet-teeth, substantially as specified.

21. In a type-writing machine, a carriage-feeding mechanism including feeding and holding ratchets, of which the latter is movable independently of the former, in the direction of movement of the carriage and through a distance equal to the combined widths of a plurality of ratchet-teeth, and is yieldingly held in a retracted position, a transversely-reciprocatory element for alternate engagement with the ratchets, and a movable stop-cam arranged in the path of said holding-ratchet for limiting its movement to a throw equal to the width of one or more ratchet-teeth, substantially as specified.

22. In a type-writing machine, a carriage-feeding mechanism including feeding and holding ratchets, of which the latter is movable independently of the former, in the direction of movement of the carriage and through a distance equal to the combined widths of a plurality of ratchet-teeth, and is yieldingly held in a retracted position, a transversely-reciprocatory element for alternate engagement with the ratchets, and an adjustable plural-sided stop-cam pivotally mounted upon one of the ratchets in the path of the other, and adapted to be arranged with either of its sides in the path of the other, the several sides of the cam being arranged at different distances from the pivot, whereby the movable ratchet may be limited to a throw equal to the width of one or more ratchet-teeth, substantially as specified.

23. In a type-writing machine, a carriage-feeding mechanism having feeding and holding ratchets movable parallel with the path of the carriage, one of the ratchets being movable independently of the other, a swinging hanger mounted for movement transversely of the ratchets, a feed-pawl carried by said hanger, means including an eccentric and connections for oscillating the hanger to cause the alternate engagement of the pawl with the ratchet, and devices, actuated by the printing mechanism, for imparting step-by-step movement to the eccentric, substantially as specified.

24. In a type-writing machine, the combination with printing mechanism, a carriage, a platen mounted upon the carriage, and platen-feeding mechanism, actuated by the printing mechanism, for imparting rotary step-by-step motion to the platen, of carriage-feeding mechanism including feeding and holding ratchets, a feed-pawl mounted for transverse movement to alternately engage said ratchets, and means actuated by the platen-feeding mechanism for reciprocating said pawl, substantially as specified.

25. In a type-writing machine, the combination with printing mechanism, a carriage, a platen mounted upon the carriage, and platen-feeding mechanism, actuated by the printing mechanism, for imparting rotary step-by-step motion to the platen, of carriage-feeding mechanism including feeding and holding ratchets, a feed-pawl mounted for transverse movement to alternately engage said ratchets, means actuated by the platen-feeding mechanism for reciprocating said pawl, and means for withdrawing said pawl from engagement with the ratchets, substantially as specified.

26. In a type-writing machine, the combination with printing mechanism, a carriage, a platen mounted upon the carriage, and platen-feeding mechanism, actuated by the printing mechanism, for imparting rotary step-by-step motion to the platen, of carriage-feeding mechanism including feeding and holding ratchets, a feed-pawl mounted for transverse movement to alternately engage said ratchets, means actuated by the platen-feeding mechanism for reciprocating said pawl, feed-pawl-supporting devices including a rocking lever having a stop-pawl for engagement with the ratchets alternately with the feed-pawl, and means for actuating the lever to withdraw the feed-pawl from engagement with the ratchets, substantially as specified.

27. In a type-writing machine, the combination with printing mechanism, a carriage, a platen mounted upon the carriage, and platen-feeding mechanism, actuated by the printing mechanism, for imparting rotary step-by-step motion to the platen, of carriage-feeding mechanism including feeding and holding ratchets, and means for limiting the independent movement of the holding-ratchet, a feed-pawl mounted for movement transversely of and parallel with the ratchets and yieldingly actuated for swinging movement in the plane of the ratchets, feed-pawl-supporting devices including a rocking lever carrying a stop-pawl for engagement with the ratchets when the feed-pawl is disengaged therefrom, means for actuating said lever to disengage the feed-pawl and allow backward longitudinal movement thereof to engage a succeeding tooth of the ratchet in the plane of which it is arranged, and connections between the platen-feeding mechanism and the feed-pawl supports for imparting transverse movement to the pawl, substantially as specified.

28. In a type-writing machine, the combination with printing mechanism, a carriage, a platen mounted upon the carriage, and platen-feeding mechanism, actuated by the printing mechanism, for imparting rotary step-by-step motion to the platen, of carriage-feeding mechanism including feeding and holding ratchets and means for limiting the independent relative movement thereof, a feed-pawl mounted for movement longitudinally and transversely with relation to the ratchets, feed-pawl-supporting devices including a hanger mounted for swinging movement transversely of the ratchets, and a rocking lever to one arm of which said pawl is pivoted for longitudinal movement, the rocking lever being provided on its other arm with a stop-pawl, and the feed-pawl being yieldingly actuated to impart a backward movement thereto when disengaged from the ratchets, means for operating said rocking lever to disengage the feed-pawl, and operating connections between the platen-feeding mechanism and the feed-pawl supports, substantially as specified.

29. In a type-writing machine, the combination with a platen-supporting carriage and printing mechanism, of carriage-feeding mechanism including feeding and holding ratchets capable of limited independent movement in parallel paths, a feed-pawl mounted for movement transversely and longitudinally with relation to the ratchets, a feed-pawl support including a hanger and a rocking lever mounted thereon, said feed-pawl being mounted upon one arm of the rocking lever and the other arm of the lever being provided with a stop-pawl for engagement with the ratchets when the feed-pawl is disengaged therefrom, means for spacing the feed-pawl backward when disengaged from the ratchet, means for operating the rocking lever to disengage the feed-pawl therefrom, and means actuated by the printing mechanism for communicating movement to the feed-pawl supports to cause transverse movement of said pawl, substantially as specified.

30. In a type-writing machine, the combination with a platen-supporting carriage and printing mechanism, of carriage-feeding mechanism including ratchets mounted for independent relative movement in parallel paths, a feed-pawl mounted for transverse and longitudinal movement with relation to the ratchets, a feed-pawl support including an oscillatory member having a stop-pawl to engage the ratchets when the feed-pawl is disengaged therefrom, means for spacing the feed-pawl backward when disengaged from the ratchet, means for actuating the oscillatory member of the feed-pawl support for disengaging the feed-pawl from the ratchets, and means operated by the printing mechanism for imparting transverse movement to the feed-pawl, substantially as specified.

In testimony that we claim the foregoing as our own we have hereto affixed our signatures in the presence of two witnesses.

THOMAS A. KILLMAN.
HERSCHEL A. BRATTEN.

Witnesses:
A. E. POTTER,
O. M. WOODSIDE.